(12) United States Patent
Neumann (10) Patent No.: US 10,197,133 B2
(45) Date of Patent: Feb. 5, 2019

(54) DOUBLE DISCONNECT TRANSMISSION REVERSER

(71) Applicant: DEERE & COMPANY, Moline, IL (US)

(72) Inventor: Clayton P Neumann, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 200 days.

(21) Appl. No.: 15/049,629

(22) Filed: Feb. 22, 2016

(65) Prior Publication Data
US 2017/0241513 A1    Aug. 24, 2017

(51) Int. Cl.
*F16H 3/08* (2006.01)
*F16H 61/04* (2006.01)
*F16H 3/093* (2006.01)
*F16H 3/14* (2006.01)

(52) U.S. Cl.
CPC .............. *F16H 3/093* (2013.01); *F16H 3/14* (2013.01); *F16H 61/0403* (2013.01); *F16H 2003/0822* (2013.01)

(58) Field of Classification Search
CPC .. F16H 3/0915; F16H 2003/0822; F16H 3/14; F16H 3/18; F16H 3/40; F16H 2037/044; F16H 48/22; F16H 48/24
USPC .................................................. 74/355, 810.1
See application file for complete search history.

(56) References Cited

U.S. PATENT DOCUMENTS

| 3,437,184 | A   |   | 4/1969 | Wilson |
|-----------|-----|---|--------|--------|
| 5,105,674 | A   | * | 4/1992 | Rea ......................... F16H 3/006 74/333 |
| 5,125,282 | A   |   | 6/1992 | Bender et al. |
| 5,280,731 | A   |   | 1/1994 | Turpin |
| 5,408,896 | A   | * | 4/1995 | Vogt .......................... F16H 3/14 74/361 |
| 6,237,738 | B1  | * | 5/2001 | Chow .................... B60K 17/04 192/218 |
| 7,703,353 | B2  |   | 4/2010 | Janson |

(Continued)

FOREIGN PATENT DOCUMENTS

DE    102012207976 A1    11/2013
EP       0004045 A1     9/1979

OTHER PUBLICATIONS

Schaeffler Symposium, AWD Disconnect—Escaping the Clutches of the Dog, PowerPoint, 2014.

(Continued)

*Primary Examiner* — Ha Dinh Ho
*Assistant Examiner* — Bobby Rushing, Jr.
(74) *Attorney, Agent, or Firm* — Klintworth & Rozenblat IP LLP (57) ABSTRACT

In accordance with an example embodiment, a transmission reverser may include a forward mode and a reverse mode. In the forward mode, a forward clutch is in the engaged condition causing an output gear to rotate with an output shaft. In the reverse mode, a reverse clutch and a disconnect clutch are in engaged conditions causing a counter shaft to rotate relative to the output shaft based upon the ratios of a first reverse gear to an idler gear and the idler gear to a second reverse gear and further causing the output gear to rotate relative to the counter shaft based upon the ratio of a third reverse gear to the output gear.

20 Claims, 8 Drawing Sheets

(56) References Cited

U.S. PATENT DOCUMENTS

| | | | |
|---|---|---|---|
| 7,918,757 B2 | 4/2011 | Janson | |
| 8,001,862 B2 * | 8/2011 | Albulushi | F16H 3/089 |
| | | | 74/329 |
| 8,757,021 B2 * | 6/2014 | Singh | F16H 3/006 |
| | | | 74/330 |
| 2008/0302195 A1 | 12/2008 | McCord | |
| 2013/0133450 A1 | 5/2013 | Hedman | |
| 2015/0027254 A1 * | 1/2015 | Guggolz | F16H 61/0246 |
| | | | 74/335 |
| 2015/0031491 A1 | 1/2015 | Otten et al. | |
| 2015/0114154 A1 * | 4/2015 | Terasawa | B63H 23/30 |
| | | | 74/404 |
| 2015/0367728 A1 | 12/2015 | Neumann | |
| 2015/0369360 A1 * | 12/2015 | Watt | F16H 61/0267 |
| | | | 74/335 |

OTHER PUBLICATIONS

German search report for patent application No. 10 2017 202 764.9 dated Nov. 19, 2018.

* cited by examiner

DOUBLE DISCONNECT TRANSMISSION REVERSER

CROSS-REFERENCE TO RELATED APPLICATIONS

Not Applicable.

FIELD OF THE DISCLOSURE

The present disclosure relates generally to transmissions having a reverser for changing the direction of a vehicle.

BACKGROUND

Transmissions are used in vehicles or work machines such as, agricultural, construction, off-road, and industrial machines, for example. Transmissions used in work machines typically provide a large number of gear ratios for propelling the vehicle. A transmission may include a reverser for changing directions of the vehicle. The reverser can be located near the output of the transmission. In some prior designs, a countershaft reverser rotates at high speeds when the vehicle is operating at high forward speeds. This can cause high windage in the reverse clutch. This can also cause gyroscopic flutter, in which the friction disk or the separator plate becomes dynamically unstable creating drag in the clutch. This drag can cause the disengaged clutch to experience a thermal failure. In other prior designs, a synchronized reverser goes to neutral when switching between forward and reverse causing a pause in the acceleration.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

According to an aspect of the present disclosure, a transmission reverser may include an output shaft operably connected to the output of a transmission and having a first reverse gear and an output gear, an idler shaft having an idler gear engaged with the first reverse gear, and a counter shaft including a second reverse gear engaged with the idler gear and a third reverse gear engaged with the output gear. The transmission reverser may include a forward clutch which releasably connects the output gear with the output shaft in an engaged position or condition, a reverse clutch, and a disconnect device which releasably connects the third reverse gear with the counter shaft in an engaged position or condition. The transmission reverser may include a forward mode and a reverse mode. In the forward mode, the forward clutch is in the engaged condition causing the output gear to rotate with the output shaft. In the reverse mode, the reverse clutch and the disconnect clutch device are in the engaged conditions causing the counter shaft to rotate relative to the output shaft based upon the ratios of the first reverse gear to the idler gear and the idler gear to the second reverse gear and further causing the output gear to rotate relative to the counter shaft based upon the ratio of the third reverse gear to the output gear.

According to an aspect of the present disclosure, a method of shifting between a forward mode and a reverse mode in a transmission reverser may include disengaging a countershaft brake which allows a counter shaft to rotate; engaging a disconnect device to releasably connect a third reverse gear to the counter shaft, the third reverse gear in engagement with an output gear; disengaging a forward clutch to disconnect the output gear from an output shaft; and engaging a reverse clutch which causes the counter shaft to rotate based upon the engagement of a second reverse gear mounted about the counter shaft with an idler gear mounted about an idler shaft and engagement of the idler gear with a first reverse gear mounted about the output shaft.

According to an aspect of the present disclosure, a method of shifting between a reverse mode and a forward mode in a transmission reverser may include disengaging a reverse clutch which allows a counter shaft to rotate independently of an output shaft; engaging a forward clutch to releasably connect an output gear to the output shaft causing the output gear to rotate with the output shaft; disengaging the disconnect device to disconnect a reverse gear from the counter shaft which allows the counter shaft to rotate independently of the output gear; and engaging the countershaft brake to impede the rotation of the counter shaft.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure.

Figure 1:
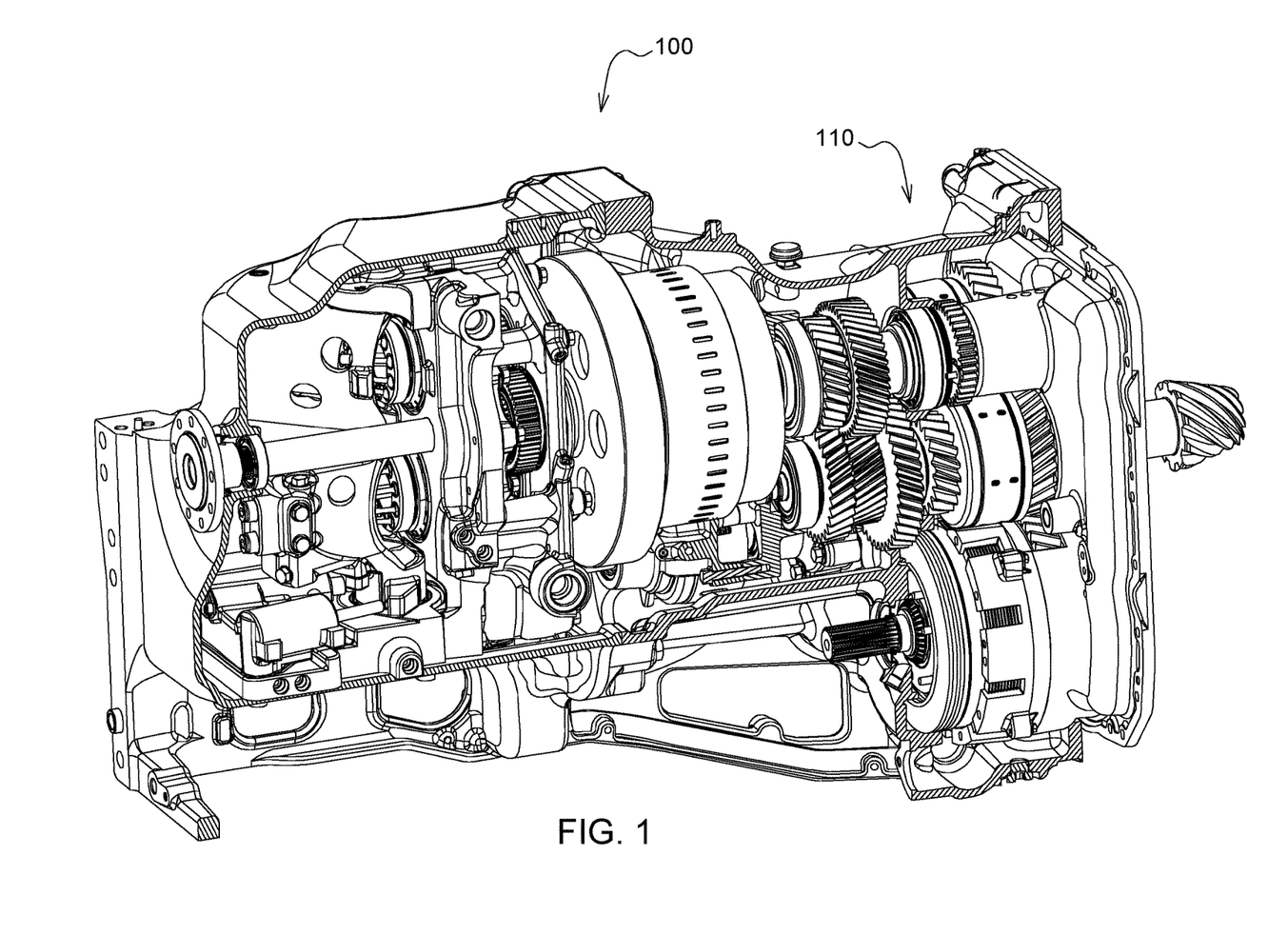
FIG. 1 is a perspective cutaway view of a transmission, according to one embodiment.

FIG. 1 illustrates a transmission 100 for a vehicle or work machine, such as a tractor, for example. The present disclosure also applies to other powered or motorized vehicles, machines, or equipment. The transmission 100 includes a housing 102 forming an interior, which provides an enclosure for one or more transmission components including, but not limited to, shafts, gears, clutches, and synchronizers. The transmission 100 may include a transmission reverser apparatus 110, which shifts the transmission output between forward and reverse. The reverser 110 can be integral with or separate from the transmission 100.

Figure 2:
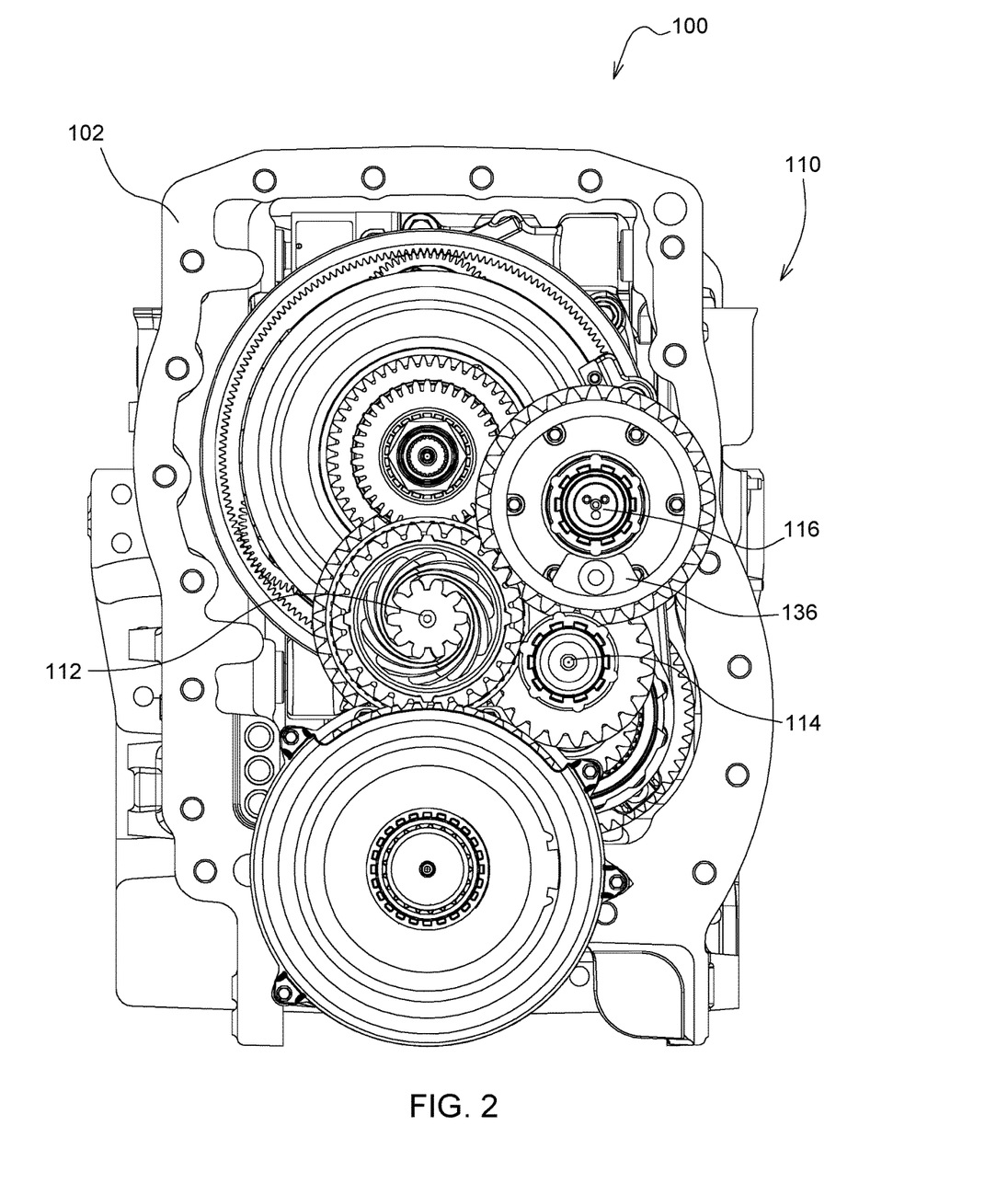
FIG. 2 is a rear perspective view of a transmission, according to one embodiment.
Figure 3:
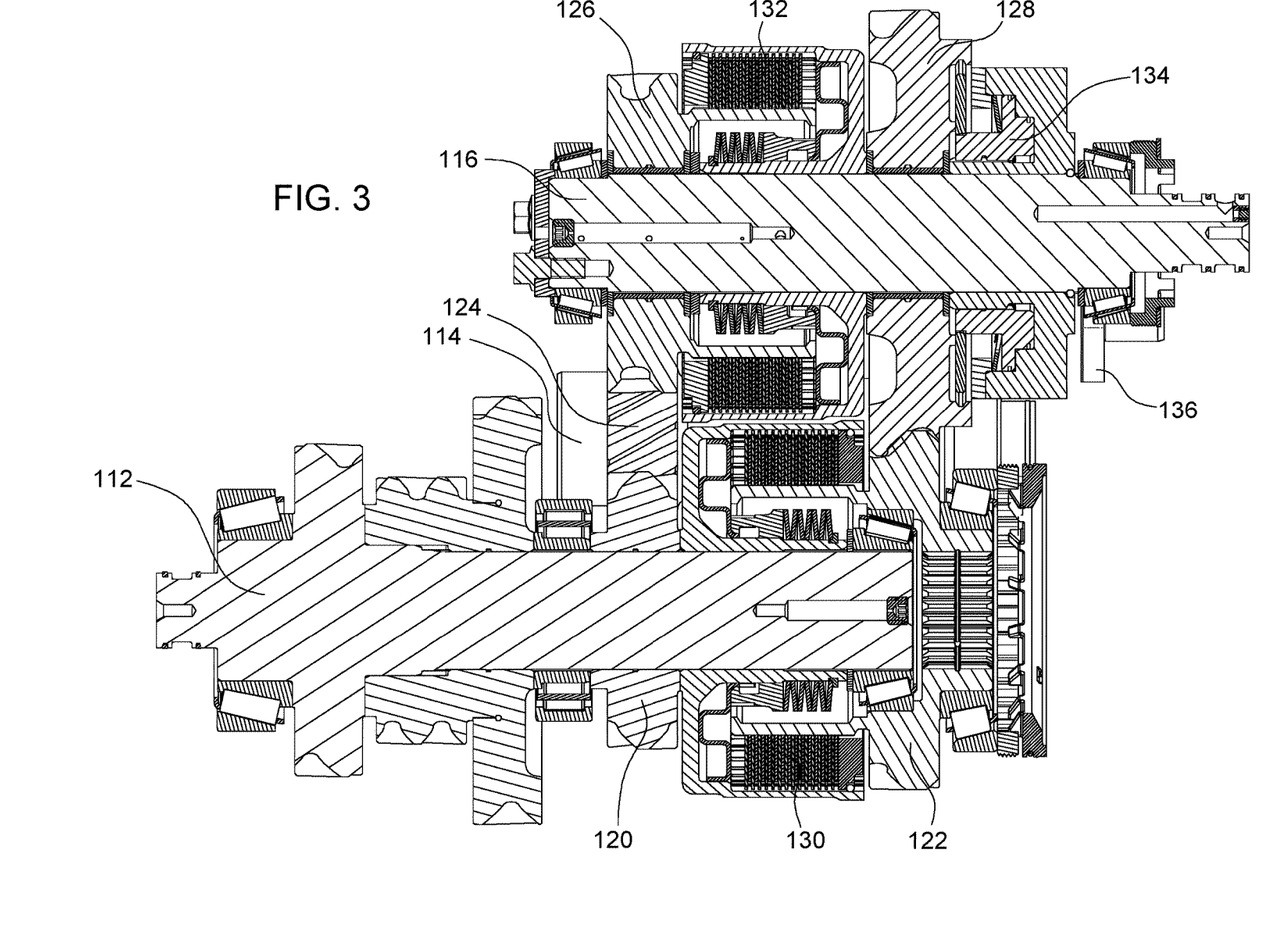
FIG. 3 is a side sectional view of a reverser, according to one embodiment.

FIGS. 2 and 3 illustrate a transmission 100 having a reverser apparatus 110, which may include one or more of the following components. The transmission 100 may include an output shaft 112, an idler shaft 114, and a counter shaft 116 rotatably connected to the transmission housing 102. The transmission 100 may include a first reverse gear 120 and an output gear 122 positioned or mounted on the output shaft 112. The output gear 122 is operatively connected to the drivetrain of a vehicle providing power to ground engaging apparatus such as wheels or tracks. The transmission may include an idler gear 124 positioned or mounted on the idler shaft 114. The transmission may include a second reverse gear 126 and a third reverse gear 128 positioned or mounted on the counter shaft 116. The transmission 110 may include a forward clutch 130, which operably connects or couples the output gear 122 with the output shaft 112 in an engaged position or condition. The forward clutch 130 may be connected to or mounted about the output shaft 112.

The transmission 110 may include a reverse clutch 132, which operably connects or couples the second reverse gear 126 with the counter shaft 116 in an engaged position or condition. The reverse clutch 132 may be connected to or mounted about the counter shaft 116. In another embodiment, the reverse clutch 132 operably connects or couples the first reverse gear 120 with the output shaft 112. The reverse clutch 132 may be connected to or mounted about the output shaft 112. In this embodiment, the output shaft 112 rotates independently of the first reverse gear 120, the idler gear 124, and idler shaft 114 when the reverse clutch 132 is disengaged. The transmission 110 may include a disconnect device, such as disconnect clutch 134, which operably connects or couples the third reverse gear 128 with the counter shaft 116 in an engaged position or condition. The disconnect clutch 134 may be connected to or mounted about the counter shaft 116. The first reverse gear 120 engages or meshes with the idler gear 124, which engages or meshed with the second reverse gear 126. The third reverse gear 128 engages or meshes with the output gear 122. The transmission 110 may include a countershaft brake 136, which reduces or stops the rotational of the counter shaft 116 in an engaged position or condition. In some embodiments, the countershaft brake 136 can impede or prevent the counter shaft 116 from rotating. This can impede or prevent the reverse clutch 132 from rotating when the countershaft brake 136 is engaged.

Figure 4:
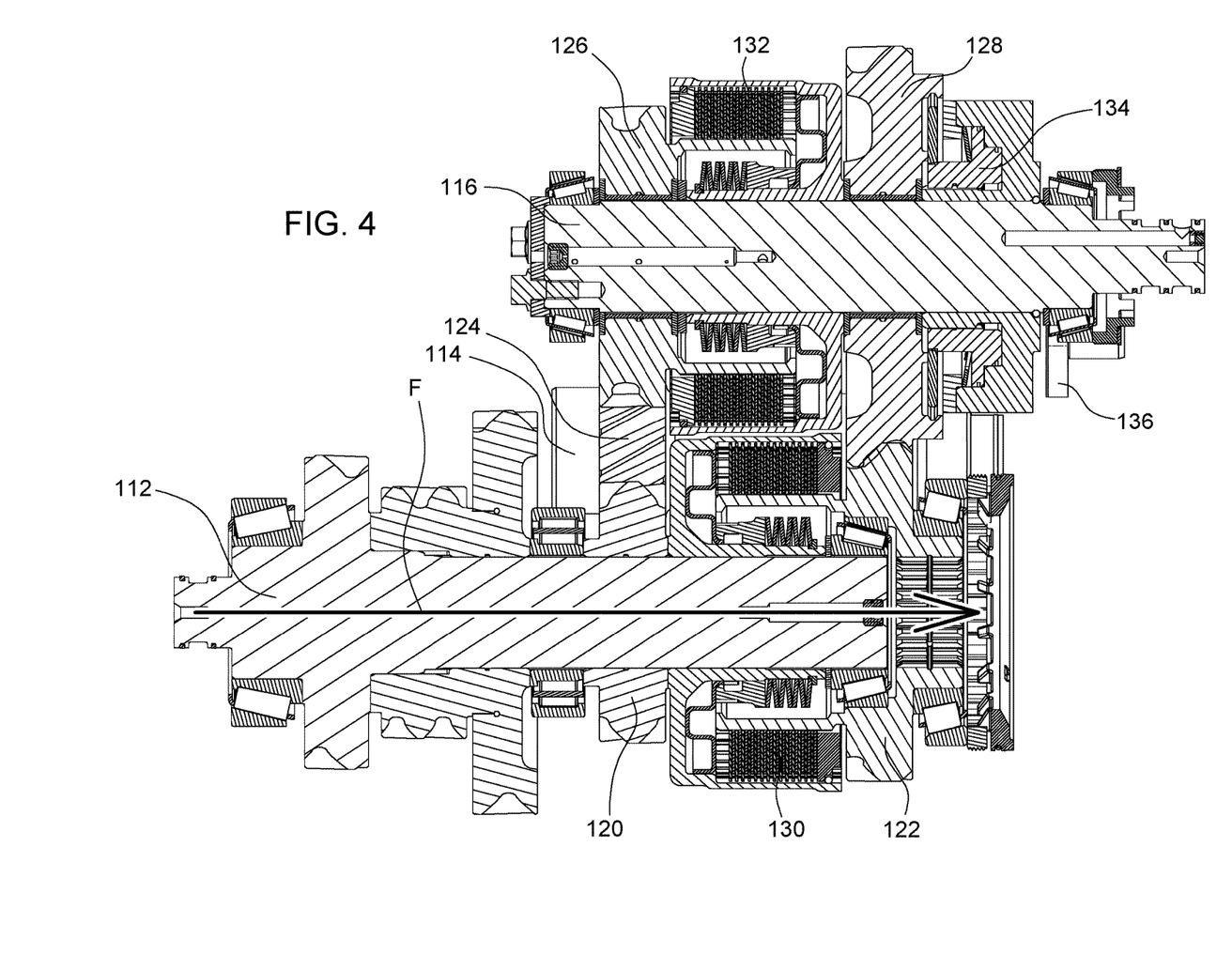
FIG. 4 is a side sectional view of a reverser illustrating the power path for the forward mode, according to one embodiment.

FIG. 4 illustrates a power path or flow for a forward mode F through the reverser apparatus 110. In the forward mode F, the forward clutch 130 is engaged causing the output gear 122 to rotate with the output shaft 112, the countershaft brake 136 is engaged impeding or preventing the counter shaft 116 from rotating, and the reverse clutch 132 and the disconnect clutch 134 are disengaged. When the countershaft brake 136 is engaged, this can also impede or prevent the reverse clutch 132 from rotating. The idler shaft 114 rotates opposite to the output shaft 112 based upon the ratio of the first reverse gear 120 to the idler gear 124. The second reverse gear 126 rotates about the counter shaft 116 in a direction opposite of the idler shaft 114 based upon the ratio of the idler gear 124 to the second reverse gear 126. At slow forward speeds, the countershaft brake 136 can be disengaged and the disconnect clutch 134 can be engaged causing the counter shaft 116 to rotate in the opposite direction as the output shaft 112 based upon the ratio of the output gear 122 to the third reverse gear 128. In some embodiments, slow forward speeds are at or below about 5 kph, 4 kph, 3 kph, 2 kph, or 1 kph.

Figure 5:
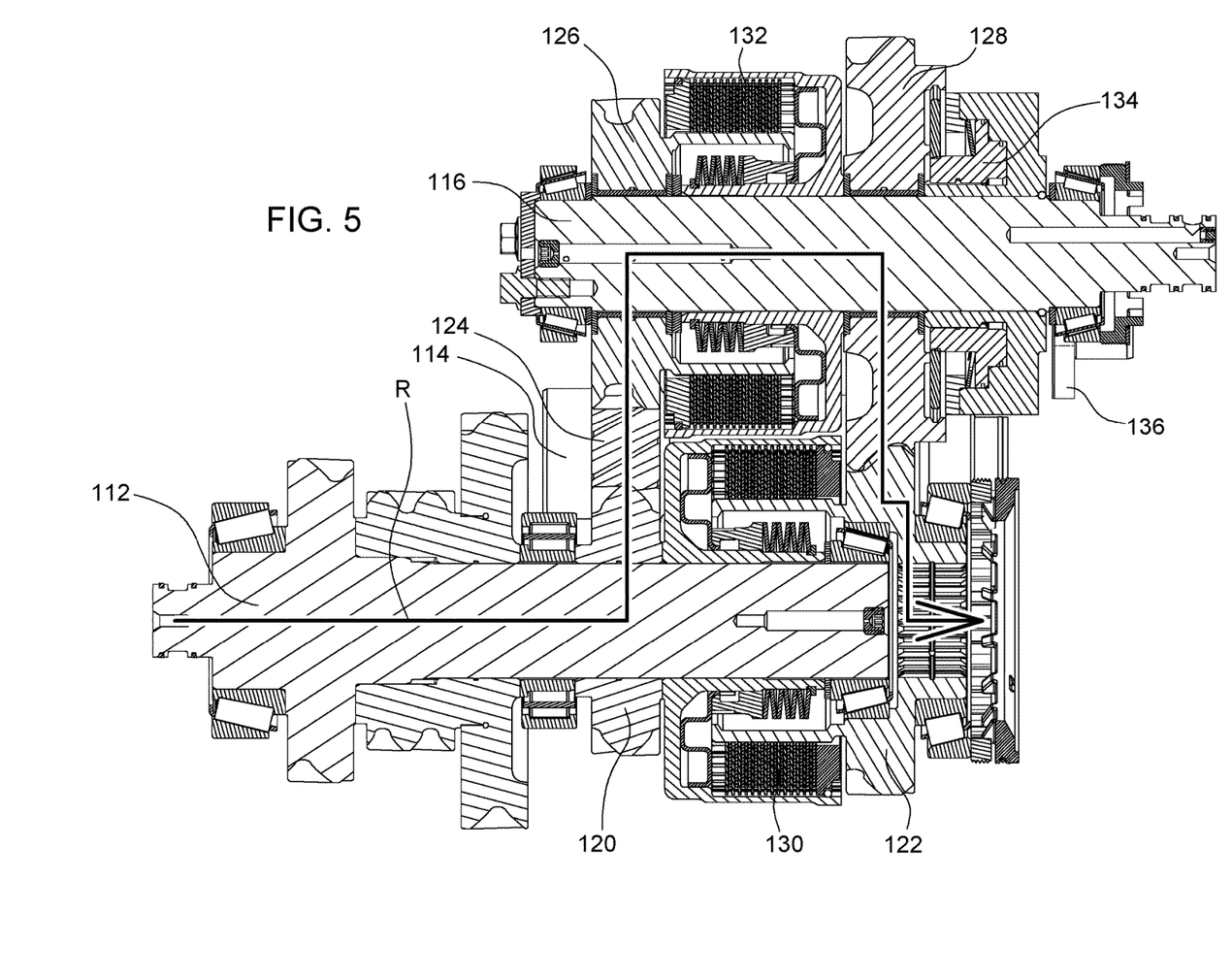
FIG. 5 a side sectional view of a reverser illustrating the power path for the reverse mode, according to one embodiment.

FIG. 5 illustrates a power path or flow for a reverse mode R through the reverser apparatus 110. In the reverse mode R, the reverse clutch 132 and the disconnect clutch 134 are engaged causing the output gear 122 to rotate in a direction opposite the output shaft 112. The forward clutch 130 and the countershaft brake 136 are disengaged. The output gear 122 rotates opposite to the counter shaft 116 based upon the ratio of the third reverse gear 128 to the output gear 122. The counter shaft 116 rotates opposite to the idler shaft 114 based upon the ratio of the idler gear 124 to the second reverse gear 126. The idler shaft 114 rotates opposite the output shaft 112 based upon the ratio of the first reverse gear 120 to the idler gear 124. As a result, the counter shaft 116 rotates in the same direction as the output shaft 112.

Figure 6:
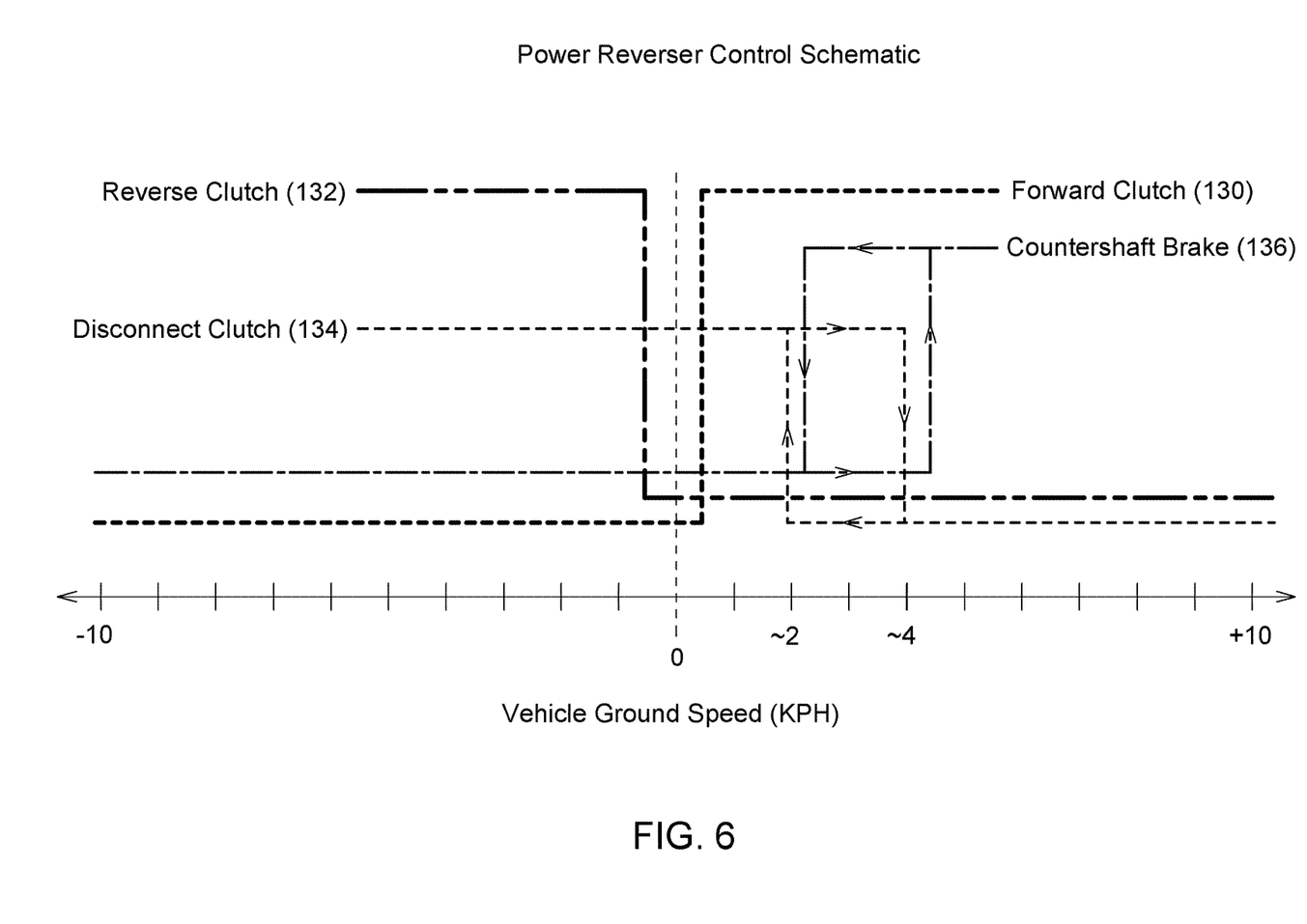
FIG. 6 is a schematic diagram of a control strategy for a transmission, according to one embodiment.

FIG. 6 illustrates a control strategy for a transmission, which may be implemented in one or more of the embodiments described herein and depicted in the various FIGURES. When the transmission is in the reverse mode R, the reverse clutch 132 and the disconnect clutch 134 are engaged and the forward clutch 130 and countershaft brake 136 are disengaged. When switching between the reverse mode R and the forward mode F, events can occur in the following order: the reverse clutch 132 is disengaged, the forward clutch 130 is engaged, the disconnect clutch 134 is disengaged, and the countershaft brake 136 is engaged. The reverse clutch 132 and the forward clutch 130 can be engaged and disengaged at slow reverse speeds, slow forward speeds, or when the vehicle is not moving.

When the transmission is in the forward mode F, the forward clutch 130 and countershaft brake 136 are engaged and the reverse clutch 132 and the disconnect clutch 134 are disengaged. When switching between the forward mode F and the reverse mode R, events can occur in the following order: the countershaft brake 136 is disengaged, the disconnect clutch 134 is engaged, the forward clutch 130 is disengaged, and the reverse clutch is engaged. The disconnect clutch 134 and the countershaft brake 136 can be engaged and disengaged at slow forward speeds or when the vehicle is not moving.

Figure 7:
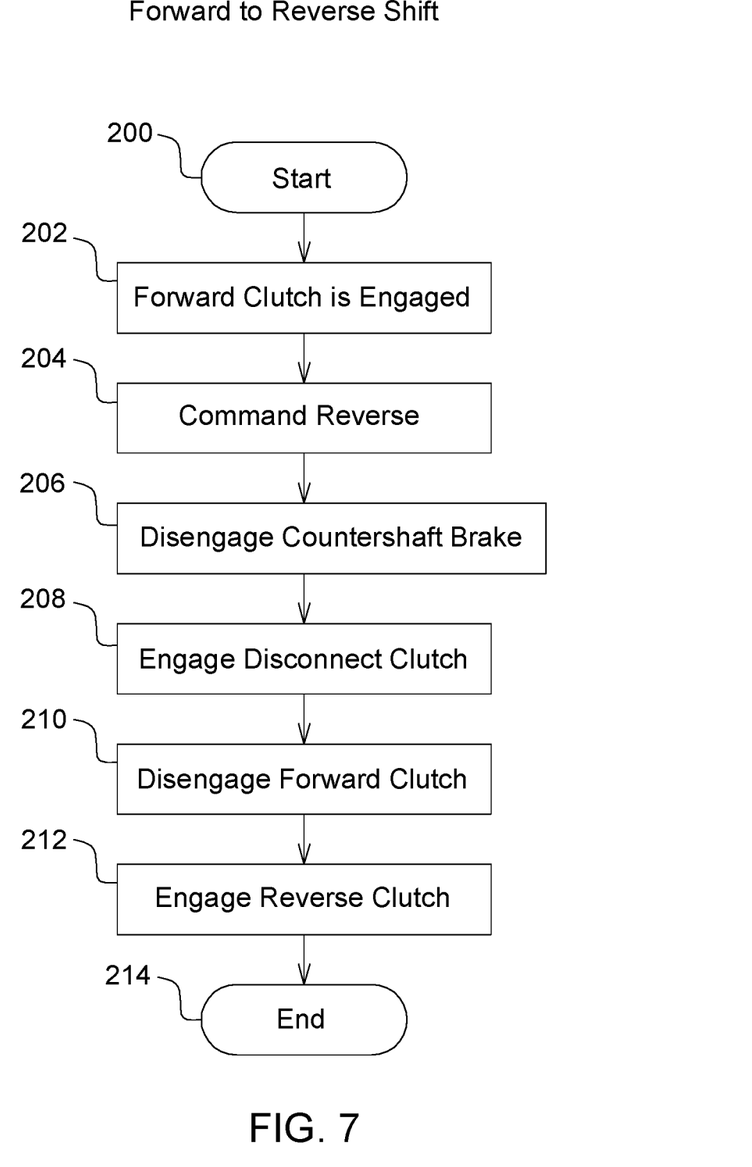
FIG. 7 is a flow diagram illustrating method of shifting between forward and reverse directions in a transmission reverser, according to one embodiment.

FIG. 7 illustrates a flow chart for a method of shifting between a forward mode and a reverse mode in a transmission reverser, according to one embodiment, which may be implemented in one or more of the embodiments described herein and depicted in the various FIGURES. At step 200, the method starts.

At step 202, the transmission is in the forward mode F with the forward clutch 130 and the countershaft brake 136 in the engaged conditions.

At step 204, the transmission receives a command to switch from the forward mode F to the reverse mode R.

At step 206, the countershaft brake 136 disengages which allows the counter shaft 116 to rotate.

At step 208, the disconnect clutch 134 engages which releasably connects or couples the third reverse gear 128 to the counter shaft 116 causing the counter shaft 116 to rotate in the opposite direction as the output shaft 112 based upon the engagement of the third reverse gear 128 with the output gear 122.

At step 210, the forward clutch 130 disengages which disconnects the output gear 122 from the output shaft 112 allowing the output gear 122 to rotate independently of the output shaft 112.

At step 212, the reverse clutch 132 engages which releasably connects or couples the second reverse gear 126 to the counter shaft 116 causing the counter shaft 116 to rotate in the same direction as the output shaft 112 based upon the engagement of the first reverse gear 120 mounted on the output shaft 112 with an idler gear 124 mounted on an idler shaft 114 and the engagement of the idler gear 124 with the second reverse gear 126.

In an alternate step 212, the reverse clutch 132 engages which releasably connects or couples the first reverse gear 120 to the output shaft 112 causing the counter shaft 116 to rotate in the same direction as the output shaft 112 based upon the engagement of the first reverse gear 120 with the idler gear 124 mounted on the idler shaft 114 and the engagement of the idler gear 124 with the second reverse gear 126 mounted on the counter shaft 116.

At step 214, the method of shifting between a forward mode and a reverse mode in a transmission reverser completes, according to one embodiment. In other embodiments, one or more of these steps or operations may be omitted, repeated, or re-ordered and still achieve the desired results.

Figure 8:
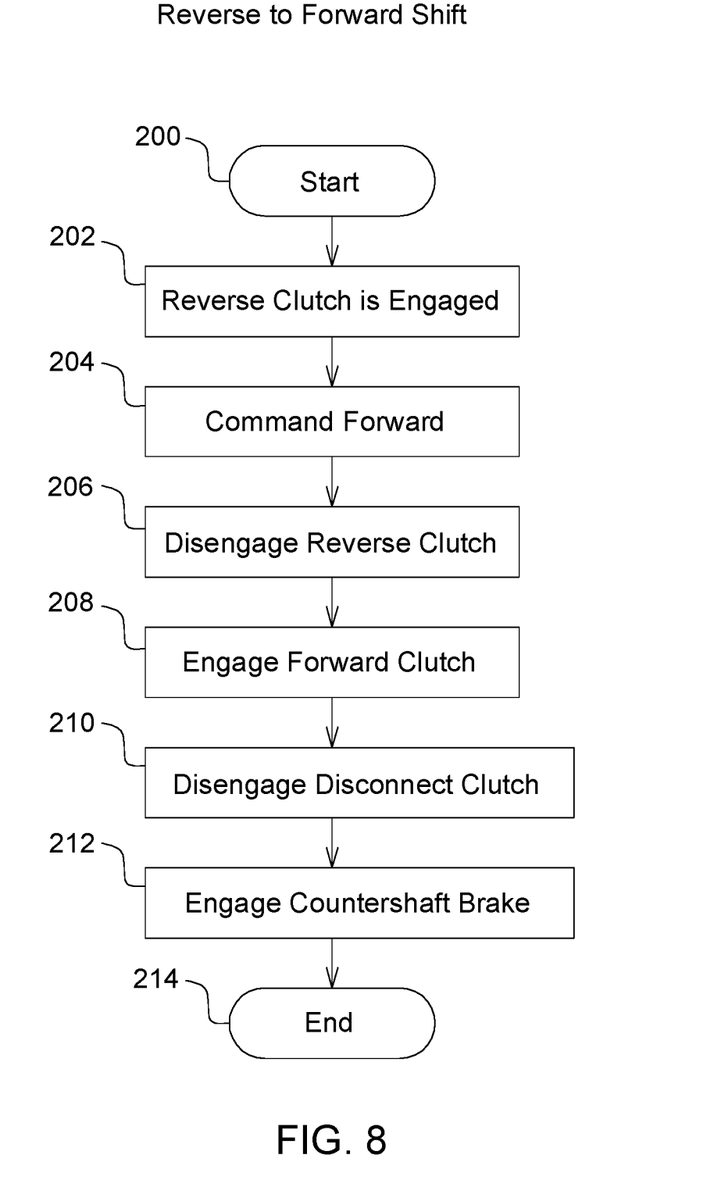
FIG. 8 is a flow diagram illustrating method of shifting between reverse and forward directions in a transmission reverser, according to one embodiment.

FIG. 8 illustrates a flow chart for a method of shifting between a reverse mode and a forward mode in a transmission reverser, according to one embodiment, which may be implemented in one or more of the embodiments described herein and depicted in the various FIGURES. At step 200, the method starts.

At step 202, the transmission is in the reverse mode R with the reverse clutch 132 and the disconnect clutch 134 in the engaged conditions.

At step 204, the transmission receives a command to switch from the reverse mode R to the forward mode F.

At step 206, the reverse clutch 132 disengages which disconnects the second reverse gear 126 from the counter shaft 116, or disconnects the first reverse gear 120 from the output shaft 112, allowing the counter shaft 116 to rotate independently of the output shaft 112.

At step 208, the forward clutch 130 engages which releasably connects or couples the output gear 122 to the output shaft 112 causing the output gear 122 to rotate with the output shaft 112.

At step 210, the disconnect clutch 134 disengages which disconnects the third reverse gear 128 from the counter shaft 116 allowing the counter shaft 116 to rotate independently of the output gear 122.

At step 212, the countershaft brake 136 engages which slows or stops the rotation of the counter shaft 116. In some embodiments, the countershaft brake 136 can then impede or prevent the counter shaft 116 from rotating.

At step 214, the method of shifting between a reverse mode and a forward mode in a transmission reverser completes, according to one embodiment. In other embodiments, one or more of these steps or operations may be omitted, repeated, or re-ordered and still achieve the desired results.

Without in any way limiting the scope, interpretation, or application of the claims appearing below, a technical effect of one or more of the example embodiments disclosed herein is a double disconnect transmission reverser for changing the direction of a vehicle between forward and reverse. Another technical effect of one or more of the example embodiments disclosed herein is a transmission reverser which reduces windage or friction in a disengaged reverse clutch. Another technical effect of one or more of the example embodiments disclosed herein is a transmission reverser which reduces the possibility of gyroscopic flutter in the disengaged reverse clutch due to lower rotational speeds. Another technical effect of one or more of the example embodiments disclosed herein is a transmission reverser which can impede or prevent counter rotation of the reverse clutch during high forward speeds of the vehicle.

The terminology used herein is for the purpose of describing particular embodiments or implementations and is not intended to be limiting of the disclosure. As used herein, the singular forms "a", "an" and "the" are intended to include the plural forms as well, unless the context clearly indicates otherwise. It will be further understood that the any use of the terms "having," "including," "comprising," or the like, in this specification, identifies the presence of stated features, integers, steps, operations, elements, and/or components, but does not preclude the presence or addition of one or more other features, integers, steps, operations, elements, components, and/or groups thereof.

The references "A" and "B" used with reference numerals herein are merely for clarification when describing multiple implementations of an apparatus.

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a restrictive or limiting sense. Rather, there are several variations and modifications which may be made without departing from the scope of the appended claims.

What is claimed is:

1. A transmission reverser comprising:
   an output shaft receiving rotational power input and operably connected to the output of a transmission, the output shaft including a first reverse gear and an output gear;
   an idler shaft including an idler gear engaged with the first reverse gear;
   a counter shaft including a second reverse gear engaged with the idler gear and a third reverse gear engaged with the output gear;
   a forward clutch including engaged and disengaged conditions, the forward clutch releasably connecting the output gear with the output shaft in the engaged condition;
   a reverse clutch including engaged and disengaged conditions;
   a disconnect device including engaged and disengaged conditions, the disconnect device releasably connecting the third reverse gear with the counter shaft in the engaged condition;
   wherein the transmission reverser is operable in:
      a forward mode which includes the forward clutch in the engaged condition causing the output shaft to transmit the rotational power input to the output gear; and
      a reverse mode which includes the reverse clutch and the disconnect device in the engaged conditions causing the output shaft to transmit the rotational power input to the output gear through the first, second and third reverse gears, the idler gear and the counter shaft.

2. The transmission reverser of claim 1, further comprising:
a countershaft brake including engaged and disengaged conditions, the countershaft brake impeding the rotation of the counter shaft in the engaged condition.

3. The transmission reverser of claim 1, wherein the reverse clutch releasably connects the second reverse gear with the counter shaft in the engaged condition.

4. The transmission reverser of claim 1, wherein the reverse clutch releasably connects the first reverse gear with the output shaft in the engaged condition.

5. The transmission reverser of claim 1, wherein the counter shaft rotates in the same direction as the output shaft and in the opposite direction of the output gear in the reverse mode.

6. The transmission reverser of claim 1, wherein the forward mode further includes the reverse clutch and the disconnect device in the disengaged conditions.

7. The transmission reverser of claim 1, wherein the forward mode further includes the reverse clutch in the disengaged condition and the disconnect device in the engaged condition at slow forward speeds.

8. The transmission reverser of claim 2, wherein the forward mode further includes the countershaft brake in the engaged condition.

9. The transmission reverser of claim 2, wherein the reverse mode further includes the forward clutch and the countershaft brake in the disengaged conditions.

10. The transmission reverser of claim 1, wherein the forward clutch is mounted about the output shaft.

11. The transmission reverser of claim 1, wherein the reverse clutch is mounted about the counter shaft.

12. The transmission reverser of claim 1, wherein the reverse clutch is mounted about the output shaft.

13. The transmission reverser of claim 1, wherein the disconnect device is a clutch mounted about the counter shaft.

14. A method of shifting from a forward mode and a reverse mode in a transmission reverser comprising:
disengaging a countershaft brake which allows a counter shaft to rotate;
engaging a disconnect device to releasably connect a third reverse gear to the counter shaft, the third reverse gear in engagement with an output gear;
disengaging a forward clutch to disconnect the output gear from an output shaft; and
engaging a reverse clutch which causes the output shaft to transmit rotational power input to the output gear through the first, second and third reverse gears, the idler gear and the counter shaft.

15. The method of claim 14, wherein the counter shaft rotates in the same direction as the output shaft when the reverse clutch is engaged.

16. The method of claim 14, wherein the reverse clutch releasably connects the second reverse gear with the counter shaft in the engaged condition.

17. The method of claim 14, wherein the reverse clutch releasably connects the first reverse gear with the output shaft in the engaged condition.

18. A method of shifting from a reverse mode and a forward mode and a forward mode in a transmission reverser comprising:
disengaging a reverse clutch which allows a counter shaft to rotate independently of an output shaft;
engaging a forward clutch to releasably connect an output gear to the output shaft causing the output gear to rotate with the output shaft;
disengaging a disconnect device to disconnect a reverse gear from the counter shaft which allows the counter shaft to rotate independently of the output gear; and
engaging a countershaft brake to impede the rotation of the counter shaft.

19. The method of claim 18, wherein the disconnect device remains engaged and the countershaft brake remains disengaged at slow forward speeds.

20. The method of claim 18, wherein engaging the countershaft brake impedes the rotation of the reverse clutch.

* * * * *